United States Patent Office 3,068,236
Patented Dec. 11, 1962

3,068,236
N-(2-IMINO-2-PHENYLETHYL)AMINES AND A PROCESS FOR THEIR PREPARATION
John Krapcho, New Brunswick, N.J., assignor to Olin Mathieson Chemical Corporation, New York, N.Y., a corporation of Virginia
No Drawing. Filed Oct. 17, 1960, Ser. No. 62,897
7 Claims. (Cl. 260—293.4)

This invention relates to a new iminophenylethylamine derivatives and, more particularly, to compounds of the general formula

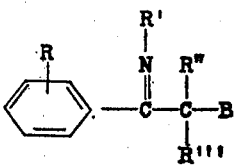

wherein R is hydrogen, lower alkyl (e.g., methyl, ethyl and isopropyl), halogen (e.g., chlorine and fluorine), halomethyl (e.g., trifluoromethyl), alkoxy (e.g., methoxy, ethoxy, propoxy and amyloxy), aryloxy (e.g., phenyloxy), hydroxy, amino, or dialkylamino (e.g., dimethylamino and diethylamino); R' is hydrogen or acyl; R'' and R''' are lower alkyl, phenyl, or, together with the carbon to which they are joined, constitute a cycloalkyl radical (e.g., cyclohexyl, cyclopentyl and cycloheptyl); and B is a basic, nitrogen-containing radical such as alkylamino, dialkylamino (e.g., dimethylamino and diethylamino), alkylaralkylamino, piperidyl (e.g., piperidino), alkylpiperidyl (e.g., 2, 3 and 4-methylpiperidino) dialkylpiperidyl (e.g., 2,4-, 2,6-, and 3,5-dimethylpiperidino); pyrrolidyl (e.g., pyrrolidino), alkylpyrrolidyl, dialkylpyrrolidyl, piperazinyl (e.g., piperazino), alkylpiperazinyl (e.g., 4-methylpiperazino), dialkylpiperazinyl, alkoxypiperazinyl and arylpiperazinyl (e.g., 4-phenylpiperazino); and the pharmaceutically acceptable acid-addition salts thereof.

Among the suitable acyl groups defined by R' may be mentioned R-substituted alkanoyl (e.g., acetyl, dichloracetyl and propionyl), R-substituted alkenoyl (e.g., 3-butenoyl), R-substituted alkadienoyl (e.g., sorboyl), R-substituted alkadienoyl, R-substituted aralkanoyl (e.g., phenacetyl), R-substituted aralkenoyl (e.g., cinnamoyl), R-substituted aroyl (e.g., benzoyl, p-chlorobenzoyl and naphthoyl), carbamyl, dialkylcarbamyl (e.g., dimethylcarbamyl and diethylcarbamyl), lower alkane sulfonyl (e.g., methanesulfonyl) and aryl sulfonyl (e.g., benzenesulfonyl), wherein R is as hereinbefore defined. The preferred compounds are those wherein R is hydrogen, R' is acetyl or phenacetyl, R'' and R''' are lower alkyl and B is piperidino.

Examples of suitable acid-addition salts of the free base compounds of this invention include the mineral acid salts, such as the hydrohalide (e.g., hydrochloride, hydrobromide and hydroiodide), the sulfate and the phosphate; and the organic acid salts, such as the citrate, tartrate, oxalate, ascorbate and succinate. Pharmacologically acceptable acids are, of course, employed where the salt form is prepared for therapeutic use.

The compounds of the present invention are prepared by a process which comprises reacting an R-substituted phenyl lithium with a nitrile of the formula

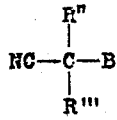

wherein R, R'' and R''' and B have the values herein-before defined, and subjecting the resulting lithium complex to mild hydrolysis thereby providing an N-unsubstituted free base of the present invention of the formula

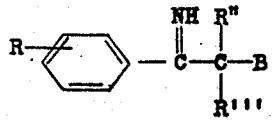

The imino compounds of this formula are readily converted to the N-substituted derivatives by treatment with an acylating agent such as an acyl halide (R' halogen) or an acid anhydride (R')₂O, wherein R' is an acyl group as hereinbefore defined.

The compounds of this invention are physiologically active substances having central nervous system activity. Thus, these compounds can be used as anorectic agents in the treatment and control of obesity. For such purposes the compounds of this invention are administered perorally with dosage adjusted for the particular activity of a given compound.

The following examples illustrate the invention (all temperatures given in degrees centigrade):

EXAMPLE 1

*1-(2-Imino-1,1-Dimethyl-2-Phenylethyl)Piperidine, Hydrochloride*

A suspension of 13.9 g. of lithium ribbon in 700 ml. of ether is treated with 157. g. of bromobenzene. The resulting solution of phenyl lithium is treated dropwise with a solution of 75.0 g. of α-piperidinoisobutyronitrile in 200 ml. of ether. The mixture is stirred and refluxed for two hours, cooled and poured slowly into a mixture of a solution of 110 g. of ammonium chloride in 700 ml. of water and 200 g. of ice. The mixture is shaken thoroughly and the aqueous phase then extracted with 300 ml. of ether, the ether extract dried over magnesium sulfate, filtered and evaporated. The residue is fractionated to give about 104 g. of pale yellow distillate; B.P. about 110–112° (0.2 mm.). 30 g. of this material is dissolved in 30 ml. of absolute alcohol and treated with one equivalent of alcoholic hydrogen chloride. The resulting solution is diluted to 400 ml. with ether, precipitating about 34 g. of colorless solid, M.P. about 175–177°. Recrystallization from 200 ml. of acetonitrile yields about 22 g. of 1-(2-imino-1,1-dimethyl-2-phenylethyl)piperidine, hydrochloride, having a melting point of about 175–177°.

EXAMPLE 2

*1-(2-Acetylimino-1,1-Dimethyl-2-Phenylethyl)Piperidine, Hydrochloride*

To a solution of 15 g. of the imino compound from Example 1 in 100 ml. of benzene there is added dropwise a cold solution of 5.5 ml. of acetyl chloride in 80 ml. of benzene. The mixture is refluxed for thirty minutes, cooled and the solid is filtered off, yielding about 15 g. of product, M.P. about 159–161° (dec.). Recrystallization from 75 ml. of acetonitrile yields about 8.5 g. of 1-(2-acetylimino-1,1-dimethyl-2-phenylethyl)piperidine, hydrochloride, having a melting point of about 171–173°.

EXAMPLE 3

*1-(1,1-Dimethyl-2-Propionylimino-2-Phenylethyl) Piperidine, Hydrochloride*

A solution of 46.0 g. of the imino compound from Example 1 is reacted with 18.5 g. of propionyl chloride in benzene solution as described in Example 2, yielding about 51.3 g. of solid, M.P. about 147–149°. Recrystallization from 450 ml. of butanone followed by recrystallization from 100 ml. of methanol—1300 ml. of ether yields about 31.7 g. of 1-(1,1-dimethyl-2-propionylimino- 2-phenylethyl)piperidine, hydrochloride, having a melting point of about 149–150°.

EXAMPLE 4

*1-(1,1-Dimethyl-2-Phenacetylamino-2-Phenylethyl) Piperidine, Hydrochloride*

Interaction of 40 g. of the imino compound from Example 1 with 27 g. of phenylacetyl chloride in benzene according to the procedure described in Example 2 yields about 62.5 g. of product, M.P. about 160–165. This material is crystallized twice from 250 ml. portions of isopropyl alcohol and then from 100 ml. methanol—1300 ml. of ether, yielding about 31.0 g. of 1-(1,1-dimethyl-2-phenacetylimino-2-phenylethyl)piperidine, hydrochloride, having a melting point of about 168.5–169.5°.

EXAMPLE 5

*1-(2-Cinnamoylimino-1,1-Dimethyl-2-Phenylethyl) Piperidine, Hydrochloride*

Interaction of 34.7 g. of the imino compound from Example 1 with 25 g. of cinnamoyl chloride in benzene according to procedure described in Example 2 gives about 26.6 g. of colorless crystalline hydrochloride of 1 - (2-cinnamoylimino-1,1-dimethyl-2-phenylethyl)piperidine, having a melting point of about 175–176°.

EXAMPLE 6

*1-(1,1-Dimethyl-2-Methanesulfonylimino-2-Phenylethyl) Piperidine, Hydrochloride*

Interaction of 33.5 g. of the imino compound from Example 1 with 16.5 g. of methanesulfonyl chloride in benzene according to the procedure of Example 2 yields about 30.2 g. of solid mtaerial, M.P. about 178–194°. This material is dissolved in 150 ml. of ethanol and the resulting solution diluted with 650 ml. of ether, yielding about 18.7 g. of colorless material, M.P. about 210–217°. Two crystallizations from 125 ml. of ethanol, yields about 12.4 g. of 1-(1,1-dimethyl-2-methane-sulfonylimino-2-phenylethyl)piperidine, hydrochloride, having a melting point of about 224–225°.

EXAMPLE 7

*1-(1,1-Dimethyl-2-Benzenesulfonylimino-2-Phenylethyl) Piperidine*

Substitution of an equivalent amount of benzenesulfonyl chloride for the methanesulfonyl chloride employed in the above reaction gives the colorless, crystalline hydrochloride of 1-(1,1-dimethyl-2-benzenesulfonylimino-2-phenylethyl)piperidine.

EXAMPLE 8

*1-(2-p-Chlorobenzoylimino-1,1-Dimethyl-2-Phenylethyl) Piperdine Hydrochloride*

Interaction of 46.0 g. of the imino compound from Example 1 with 35.0 g. of p-chlorobenzoyl chloride in benzene according to the procedure in Example 2 yields the colorless crystalline hydrochloride of 1-(2-p-chlorobenzoylimino-1,1-dimethyl-2-phenylethyl)piperidine, hydrochloride.

EXAMPLE 9

*1-(1,1-Dimethyl-2-Sorboylimino-2-phenylethyl) Piperidine, Hydrochloride*

Replacement of the acetyl chloride in Example 2 by 8.5 g. of sorboyl chloride gives the colorless crystalline hydrochloride of 1 - (1,1 - dimethyl - 2-sorboylimino-2-phenylethyl) piperidine, hydrochloride.

EXAMPLE 10

*1-(2-Dichloroacetylimino-1,1-Dimethyl-2-Phenylethyl) Piperidine Hydrochloride*

Replacement of the acetyl chloride in Example 2 by 9.6 g. of dichloroacetyl chloride gives the colorless crystalline hydrochloride of 1-(2-dichloroacetylimino-1,1-dimethyl-2-phenylethyl)piperidine hydrochloride.

EXAMPLE 11

*1-[2-Imino-1,1-Dimethyl-2-(4-Methoxyphenyl)Ethyl] Piperidine, Hydrochloride*

Following the procedure of Example 1 except for the substitution of an equivalent amount of 4-methoxyphenyl lithium for the phenyl lithium used therein, yields the product 1 - [2-imino-1,1-dimethyl-2-(4-methoxyphenyl) ethyl]piperidine, hydrochloride.

Similarly, substitutions of the equivalent amounts of 4-methylphenyl lithium, 2-fluorophenyl lithium, 3-trifluorophenyl lithium, 2-phenoxyphenyl lithium, 2-hydroxyphenyl lithium, 4-aminophenyl lithium and 4-dimethylaminophenyl lithium yield, respectively, the hydrochlorides of the following products:

1-[2-imino-1,1-dimethyl-2-(4-methylphenyl)ethyl]piperidine,

1-[2-imino-1,1-dimethyl-2-(2-fluorophenyl)ethyl]piperidine,

1-[2-imino-1,1-dimethyl-2-(3-trifluoromethylphenyl)ethyl]piperidine,

1-[2-imino-1,1-dimethyl-2-(2-phenoxyphenyl)ethyl] piperidine,

1-[2-imino-1,1-dimethyl2-(2-hydroxyphenyl)ethyl] piperidine,

1-[2-imino-1,1-dimethyl-2-(4-aminophenyl)ethyl]piperidine, and

1-[2-imino-1,1-dimethyl-2-(4-dimethylaminophenyl) ethyl]piperidine.

EXAMPLE 12

*1-(2-Imino-1,1-Dimethyl-2-Phenylethyl)-4-Methyl- Piperazine*

PART A. 2-METHYL-2-(4-METHYL-1-PIPERAZINYL)-PROPIONITRILE

A cold solution of 90 g. of acetonecyanohydrin is treated portionwise with 100 g. of 1-methylpiperazine and then heated at 85–90° for two hours. The mixture is then refluxed for thirty minutes, after which it is fractionated giving about 137 g. of colorless distillate, B.P. about 85–90° (6 mm.). Crystallization of 131 g. of this material from 150 ml. of hexane, yields about 115 g. of 2-methyl-2-(4-methyl-1-piperazinyl) propionitrile, having a melting point of about 58°–60°.

PART B. 1-(2-IMINO-1,1-DIMETHYL-2-PHENYLETHYL)-4-METHYLPIPERAZINE

A solution of 84 g. of material from Part A in 200 ml. of ether is added to 700 ml. of ethereal solution containing one equivalent of phenyl lithium and the reaction is then carried out by the procedure employed in Example 1, yielding about 87.8 g. of a nearly colorless product boiling at about 115–117° (0.2 mm.). Two crystallizations of 25 g. of this material from 25 ml. portions of hexane gives about 22 g. of 1-(2-imino-1,1-dimethyl-2-phenylethyl)-4-methylpiperazine, having a melting point of about 66–69°.

EXAMPLE 13

*1 - (2 - Dimethylcarbamylimino - 1,1 - Dimethyl - 2-Phenylethyl)-4-Methylpiperazine*

A solution of 25.0 g. of material from Part B of Example 11 in 100 ml. of benzene is cooled and treated with 11.0 g. of dimethylcarbamyl chloride and the resulting solution refluxed for eight hours. After cooling, the solution is filtered, giving about 25.2 g. of the hydrochloride salt. 19.6 g. of this material is dissolved in 50 ml. of water and treated with 56 ml. of normal sodium hydroxide solution. The mixture is extracted three times with 200 ml. portions of ether, dried over magnesium sulfate, filtered and evaporated. The residue, upon trituration with hexane, gives about 15.7 g. of solid, M.P.

about 97–100°. Two crystallizations from 100 ml. portions of hexane, yield about 13.5 g. of 1-(2-dimethylcarbamylimino - 1,1 - dimethyl - 2 - phenylethyl) - 4 - methylpiperazine, having a melting point of about 104–105°.

EXAMPLE 14

1-(2-Imino-1,1-Dimethyl-2-Phenylethyl)-4-Phenylpiperazine

PART A. 2-METHYL-2-(4-PHENYL-1-PIPERAZINYL)-PROPIONITRILE

A mixture of 57 g. of 1-phenylpiperazine and 29.8 g. of acetonecyanohydrin is heated on a steam bath for three hours and then allowed to cool. Crystallization of the resulting solid from 300 ml. of isopropanol gives about 60.6 g. of 2-methyl-2-(4-phenyl-1-piperazinyl)propionitrile, having a melting point of about 111–112°.

PART B. 1-(2-IMINO-1,1-DIMETHYL-2-PHENYLETHYL)-4-PHENYLPIPERAZINE

Interaction of 61.0 g. of material of Part A with a solution of 50.4 g. of phenyl lithium in 1900 ml. of ether according to the procedure described in Example 1 gives about 76.8 g. of 1-(2-imino-1,1-dimethyl-2-phenylethyl)-4-phenylpiperazine, M.P. about 85–90°. Upon purification by recrystallization from 95% ethanol, the colorless product melts at about 93–94°.

EXAMPLE 15

1-(Imino-1,1-Dimethyl-2-Phenylethyl)Pyrrolidine

PART A. 2-METHYL-2-PYRROLIDINOPROPIONITRILE

A mixture of 125 g. of pyrrolidine and 150 g. of acetonecyanohydrin is heated on a steam bath for three hours and then fractionated to give about 230 g. of 2-methyl-2-pyrrolidinopropionitrile, B.P. 67–70° (0.5 mm.).

PART B. 1-(2-IMINO-1,1-DIMETHYL-2-PHENYLETHYL)-PYRROLIDINE

A solution of 230 g. of material from Part A is reacted with a solution of 279 g. of phenyl lithium in ether according to the procedure of Example 1, yielding about 283 g. of 1-(2-imino-1,1-dimethyl-2-phenylethyl)pyrrolidine, a pale yellow liquid, B.P. about 107–112° (0.2 mm.).

EXAMPLE 16

N-(2-Imino-1,1-Dimethyl-2-Phenylethyl)-N-Methylbenzylamine

PART A. 2-(N-METHYLBENZYLAMINO)-2-METHYL-PROPIONITRILE

A mixture of 170 g. of N-methylbenzylamine and 127 g. of acetonecyanohydrin is refluxed for three hours and then fractionated to give about 62 g. of 2-(N-methylbenzylamino)-2-methylpropionitrile, B.P. about 109–114° (0.2 mm.).

PART B. N-(2-IMINO-1,1-DIMETHYL-2-PHENYLETHYL)-N-METHYLBENZYLAMINE

An ethereal solution of 62 g. of material from Part A is reacted with 81 g. of phenyl lithium in ether and the product is isolated as in Example 1, giving about 63 g. of N-(2-imino-1,1-dimethyl-2-phenylethyl)-N-methylbenzylamine, B.P. about 139–144° (0.1 mm.).

EXAMPLE 17

N-(2-Imino-1,1-Dimethyl-2-Phenylethyl)Diethylamine

Following the procedure of Example 1, except for the substitution of 73 g. of α-diethylaminoisobutyronitrile for the α-piperidineisobutyronitrile employed therein, yields the product N-2-imino-1,1-dimethyl-2-phenylethyl)-diethylamine.

EXAMPLE 18

1-(1-Benzimidoylcyclohexyl)Piperidine

PART A. 1-PIPERIDINOCYCLOHEXANENITRILE

A mixture of 187 g. 1-hydroxycyclohexanenitrile and 127 g. of piperidine is refluxed for two hours and then distilled to give about 198 g. of 1-piperidinocyclohexanenitrile, B.P. about 118–121° (0.7 mm.). Following crystallization from 50% ethanol, the product melts at about 69–70°.

PART B. 1-(1-BENZIMIDOYLCYCLOHEXYL)-PIPERIDINE

Interaction of 138 g. of material from Part A with 83.5 g. of phenyl lithium in ether according to the procedure of Example 1 gives about 151 g. of 1-(1-benzimidoylcyclohexyl) piperidine; M.P. about 85–89°. After recrystallization from aqueous methanol, the purified material melts at about 88–89°.

EXAMPLE 19

1-[1-(N-Acetylbenzimidoyl)Cyclohexyl]Piperidine, Hydrochloride

A solution of 108 g. of material from Part B of Example 18 in 450 ml. of benzene is added to a cold solution of 32.5 g. of acetyl chloride in 400 ml. of benzene and the resulting mixture is refluxed for three hours, cooled and filtered, yielding about 123.5 g. of material, M.P. about 151–158°. Recrystallizations from butanone and methanol-ether give 1[-N-acetylbenzimidoyl)cyclohexyl]piperidine, hydrochloride, having a melting point of about 159–161°.

EXAMPLE 20

N-(2-Imino-1-Methyl-1,2-Diphenylethyl)-Dimethylamine, Hydrochloride 87 g. of α-dimethylamino-α-phenylpropionitrile is reacted with 84 g. of phenyl lithium according to the procedure described in Example 1, giving N-(2-imino-1-methyl-1,2-diphenylethyl)dimethylamine, hydrochloride.

The invention may be variously otherwise embodied within the scope of the appended claims.

What is claimed is:

1. A compound selected from the class consisting of compounds of the following formula

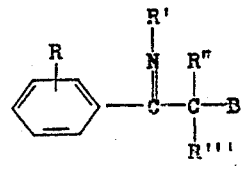

wherein R is a member selected from the group consisting of hydrogen, lower alkyl, halogen, halomethyl, alkoxy, phenyloxy, hydroxy, amino and dialkylamino; R' is a member selected from the group consisting of hydrogen alkanoyl, alkenoyl, sorboyl, phenacetyl, cinnamoyl, benzoyl, chlorobenzoyl, napthoyl, carbamyl, dialkylcarbamyl, lower alkane sulfonyl and benzenesulfonyl; R" and R''' are individually members selected from the group consisting of lower alkyl and phenyl and together with the carbon to which they are joined R" and R''' are selected from the group consisting of cyclohexyl, cycloheptyl and cyclopentyl; B is a member selected from the group consisting of alkylamino, dialkylamino, (lower alkyl)phenyl (lower alkyl)amino, piperidino, pyrrolidino, $N^4$-alkylpiperazino and $N^4$-phenylpiperazino; and the pharmaceutically-acceptable non-toxic acid-addition salts thereof.

2. 1-(2-imino-1,1-dimethy l -2 - phenylethyl)piperidine, hydrochloride.

3. 1(2-acetylimino-1,1-dimethyl-2-phenylethyl) - piperidine, hydrochloride.

4. 1-(1,1-dimethyl-2-phenacetylimino-2 - phenylethyl)-piperidine, hydrochloride.

5. 1-(1,1-dimethyl-2-methanesulfonylimino - 2 - phenylethyl)-piperidine, hydrochloride.

6. A process for the preparation of a compound selected from the group consisting of compounds of the formula

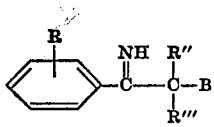

wherein R is a member selected from the group consisting of hydrogen, lower alkyl, halogen, halomethyl, alkoxy, phenyloxy, hydroxy, amino and dialkylamino; R'' and R''' are individually members selected from the group consisting of lower alkyl and phenyl and together with the carbon to which they are joined R'' and R''' are selected from the group consisting of cyclohexyl, cycloheptyl and cyclopentyl; and B is a member selected from the group consisting of alkylamino, dialkylamino, (lower alkyl)-phenyl (lower alkyl)amino, piperidino, pyrrolidino, N⁴-alkylpiperazino and N⁴-phenylpiperazino; and the pharmaceutically-acceptable non-toxic acid-addition salts thereof, which comprises the steps of reacting a compound of the formula

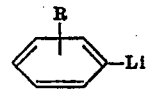

with a nitrile of the formula

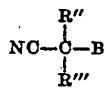

and subjecting the resulting complex to mild hydrolysis to provide the N-unsubstituted free base of the formula

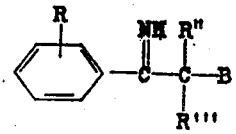

wherein R, R'', R''' and B are as defined.

7. The process of claim 6 wherein the resulting N-unsubstituted free base is reacted with an acylating agent selected from the class consisting of acyl halide and acid anhydride and recovering the resulting N-acylated product.

No references cited.